United States Patent [19]

Takenaka

[11] 3,893,177

[45] July 1, 1975

[54] AUTOMATIC PROGRAM FINDER SYSTEM FOR TAPE DECKS

[75] Inventor: Takashi Takenaka, Kamo-gun, Japan

[73] Assignee: Sharp Kabushiki Kaisha, Osaka, Japan

[22] Filed: Sept. 5, 1973

[21] Appl. No.: 394,532

[52] U.S. Cl. .......................... 360/72; 179/100.2 PS
[51] Int. Cl.... G11b 27/22; G11b 15/18; G11b 15/02
[58] Field of Search ............ 360/72, 74, 75, 78, 71, 360/137, 12–13; 353/25–26; 179/100.1 PS, 100.1 VC, 100.1 R

[56] References Cited

UNITED STATES PATENTS

| | | | |
|---|---|---|---|
| 3,194,895 | 7/1965 | Treadwell | 360/72 |
| 3,423,743 | 1/1969 | Silverman | 360/72 |
| 3,427,408 | 2/1969 | Lempert et al. | 360/72 |
| 3,601,553 | 8/1971 | Cooper, Jr. et al. | 360/72 |
| 3,723,666 | 3/1973 | Ferrari | 360/72 |

*Primary Examiner*—Alfred H. Eddleman
*Attorney, Agent, or Firm*—Stewart and Kolasch, Ltd.

[57] ABSTRACT

An automatic program finder system useful with tape decks is adapted and designed to each program recorded on the tape and more specifically the beginning point and ending point of each program and then stop the tape under fast forward and rewind modes. Afterward, the beginning point of each program is precisely positioned in operation position when initiating the playback mode. While the blank area between each program is in physical contact with a sensing head, it is electrically sensed by detecting the presence or absence of the reproduction outputs within the head. That is, the blank area is determined in view of the fact that no reproduction outputs appear during a predetermined period of time. In response to such determination, the tape recorder is automatically shifted to the succeeding operation mode, for example, such as stop mode or playback mode. This system provides foolproof quick program selection.

5 Claims, 3 Drawing Figures

AUTOMATIC PROGRAM FINDER SYSTEM FOR TAPE DECKS

BACKGROUND OF THE INVENTION

This invention relates to an automatic program finder system attached to a tape-loading recorder in which a blank area between programs on which no signals are recorded is detected under a tape fast travel mode, such as fast forward and rewind modes and, in accordance with the results of the detection, tape movement is automatically inhibited thereby facilitating precise positioning of the beginning of each program in an operative position prior to the succeeding playback mode. In particular, this invention is concerned with an improvement in the program finder systems which accurately senses blank areas between program record areas and precisely positions the beginning of each program.

In the past, automatic program detection systems have been provided wherein reproduction outputs of signals recorded on the tape are rectified and the rectified signals enable charging of a capacitor used therein. In the absence of the reproduction outputs the capacitor is allowed to discharge continuously through a discharge time constant circuit and a voltage sensor detects the blank area between the programs by sensing that voltage across the capacitor falls below a predetermined level. Nevertheless, there is the possibility that this type of the program finder system will be accidently operative thereby causing the recorder system to be led into the stop or playback operation mode under the following circumstances: first, if the tape on which there are no recorded signals at all, for instance, a virgin tape is loaded; second, if the blank area between the record areas is comparatively long; last, if there are little or no recorded signals on the tape and such recorded area has been passed over. In these conditions, the positioning of the program begining must be carried out again because at this time the tape position relative to the head is not placed at the beginnings of the individual programs. The positioning operations must be repeated many times until the beginnings of the programs are reached.

OBJECTS AND SUMMARY OF THE INVENTION

It is, therefore, an object of the invention to provide an improved program finder system having the function of precisely positioning the heads or beginnings of programs recorded on a tape.

Thus, in accordance with the invention, there is provided a program finding system wherein a capacitor is connected with a charging circuit when reproduction outputs of the recorded signals are provided and connected alternatively with a discharge circuit when the reproduction outputs are not provided over a predetermined period of time. An additional capacitor is coupled with the discharge circuit, the discharge voltage across which allows the capacitor to be charged. When such charge voltage falls below a predetermined value, a detection output indicative of the presence of the blank area is created as control signals to activate an automatic system for shifting operational states of the tape recorder. In this manner, only the blank area between the signal areas or programs is accurately detected thereby to accomplish precise positioning of heads of the individual programs.

In a preferred embodiment of the invention, the switching circuit for the charge circuit and the discharge circuit comprises a diode deposited in the charge circuit in a forward direction and a transitor, the base and emitter thereof being, connected with both terminals of the diode respectively. Said transistor is OFF in response to the voltage across the diode when the diode is ON and is conversely ON when the diode is OFF. This arrangement provides a stable switching circuit. The system of the invention seeks to detect only the blank area interposed between signal recorded areas and thus the head positioning operation is not effected for a tape on which no signals are recorded at all, such as virgin tape.

In addition, a rotation detector mechanism is provided to supply pulse outputs which charge the additional capacitor described above. The automatic system for shifting operational states of the recorder apparatus is responsive to the presence and the absence of the pulse outputs derived from the rotation detector mechanism too. Where the automatic system is an automatic stop system, the recorder apparatus may be shifted to the stop state by means of a combination of the finder system of the invention and the automatic stop system when the reel wheel stops rotating at the end of the tape.

DESCRIPTION OF THE PREFERRED EMBODIMENTS

Figure 1:
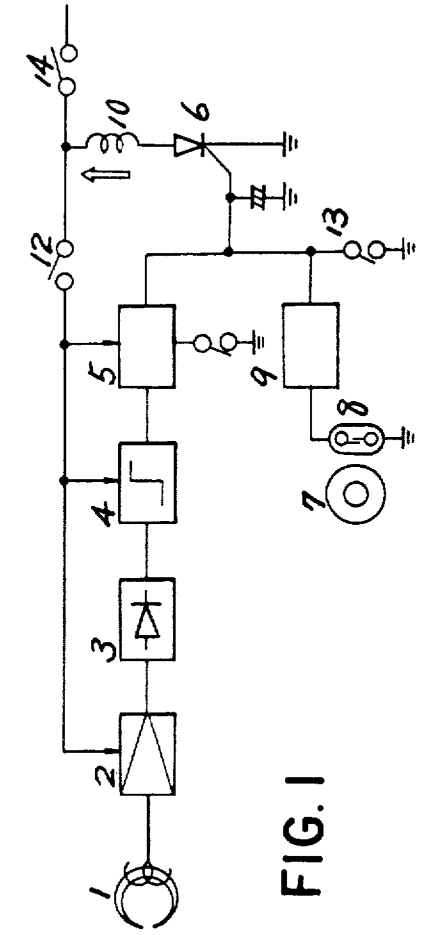
FIG. 1 is a schematic block diagram of a head positioning system in accordance with the invention.

Referring now to FIG. 1, there is illustrated an automatic program finder and head positioning system in accordance with the invention. In this drawing, a sensing head 1 is provided independent of a record/-playback head (not shown) and is in physical contact with the tape under a fast forward or rewind mode. The sensing transducer head 1 is coupled with a flat amplifier 2 (that is, having flat frequency response within audio frequency band), the outputs of which are supplied to a rectification circuit 3. This circuit provides envelope outputs on the positive or negative side with respect to the output waveform from the head 1. A level comparator 4 at the succeeding stage compares the envelope outputs with a reference level established therein and, as a result of the comparision, determines whether the portion of the tape in contact with the head 1 is either the signal presence area or the signal absence area. The detection outputs are introduced into a storage and gate output circuit 5 which determines only the blank area, for example, the blank area between the pieces of music of music tape and provides a gate electrode of SCR 6 with ignition outputs for turning SCR 6 ON.

A ring magnet 7 is affixed to rotation member such as supply reel wheel rotating in association with tape travel. A magnetically sensitive reed switch 8 is disposed adjacent the magnet 7. The provision of an auto stop control circuit 9 is made for supplying negative outputs to the gate of SCR 6 when the switch 8 is repeatedly switched between the ON and the OFF states and positive outputs when the switch 8 becomes stable in the ON or OFF state.

Between SCR 6 and a source of voltage there is a winding 10 of a plunger which functions to pull a rock plate associated with the push button arrangement of the recorder apparatus in an unfastening direction and accordingly shifts operational states of the apparatus to the stop mode.

Although in the foregoing example the plunger serves to unfasten all the rocked conditions of the push buttons, in order for the head positioning system to cooperate with the auto stop system. In case of no requirement, the plunger may be operative to cause the conditions of the recorder apparatus to shift to the playback mode.

Figure 2:
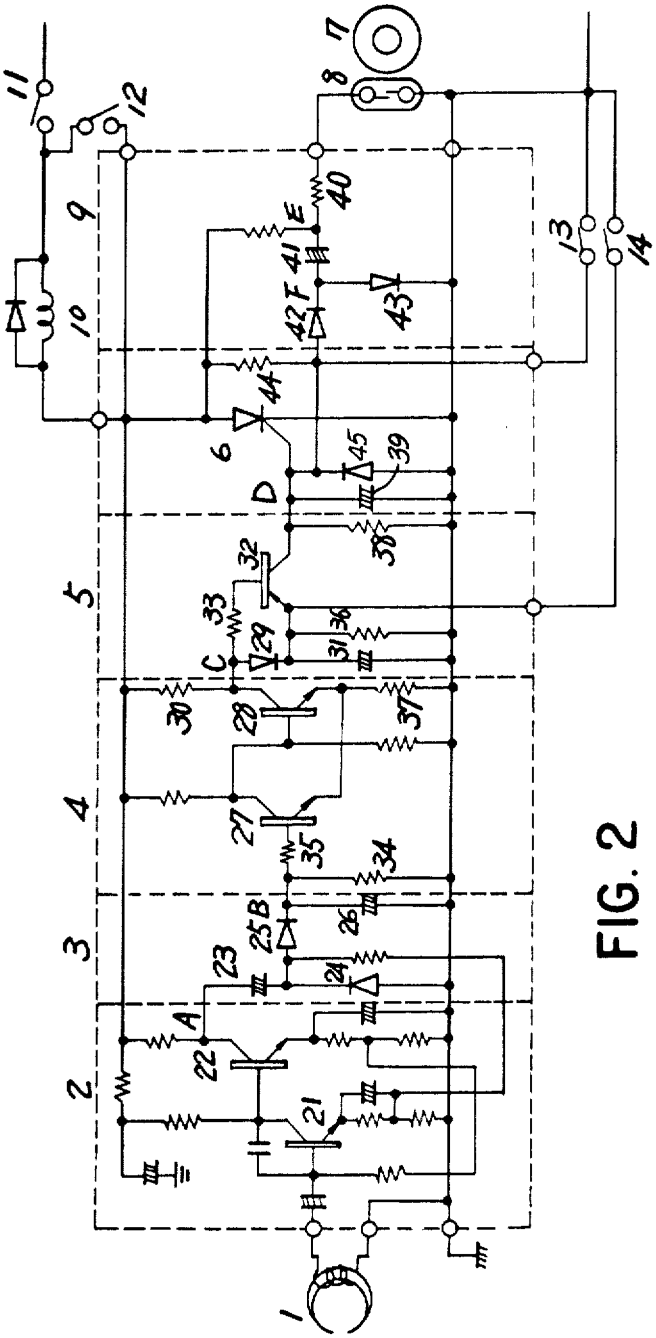
FIG. 2 is a circuit diagram of the head positioning system illustrated in FIG. 1.

The detailed circuit construction of the individual blocks of FIG. 1 is illustrated in FIG. 2 wherein similar reference designations as used in FIG. 1 are provided wherever possible to designate similar elements.

Four switches are installed in the circuit construction to control the modes of operation of the head positioning system: a main switch 11 coupled to the power source; a switch 12 for connecting the head positioning system with the power source in conjunction with the fast forward or the rewind mode; a switch 13 connected between the plunger energizing circuit and ground to prevent change of the operation states of the head positioning system in conjunction with the pause mode, and a switch 14 connected between the storage and gate output circuit 5 and ground to prevent operation of the head positioning system.

Figure 3:
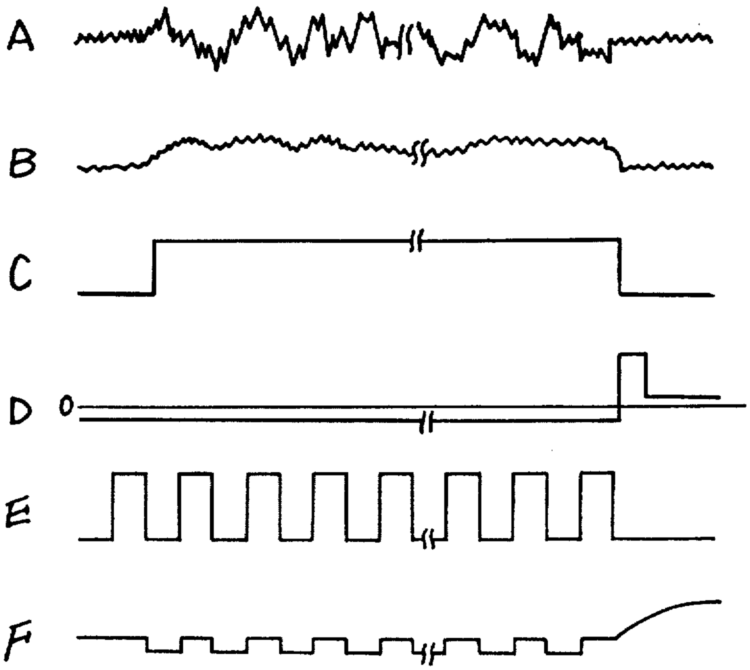
FIG. 3 is a chart showing the relationship of various pulses which occur in the circuit of FIG. 2.

The head positioning system of the invention initiates the operations thereof when a main switch 11 is ON to supply power and head positioning ON/OFF and when switch 12 is on switch 14 is OFF, causing the recorder apparatus to shift to the fast forward or the rewind mode. Upon shifting to the fast forward or the rewind mode, the sensing head 1 contacts the tape and reproduces music signals therefrom which in turn are supplied to the flat amplifier 2 comprised of transistors 21, 22. The amplified outputs are then boosted and rectified in voltage through a combination of a capacitor 23 and two diodes 24, 25, thereby charging the capacitor 26 in a positive direction. The changes in the voltage charged across the capacitor 26 may be seen from FIG. 3, B. When the charged voltage B across the capacitor 26 exceeds a predetermined level, the level comparator 4 of Schmitt trigger circuit including transistors 27, 28 is turned ON. It is assumed for the purpose of explanation that the music signals or signals within the music programs occur when the transistor 27 is ON and the transistor 28 is OFF and, alternatively, the music signals do not occur when the former is OFF and the latter is ON. Signals as shown by C, FIG. 3 enable positive power voltage to charge the capacitor 31 via a diode 29 and a resistor 30. In the presence of the music signals the capacitor 31 is charged to the approximate source voltage because of the OFF state of the transistor 28, which charged voltage is supplied to the emitter of the transistor 32. Since the base of the transistor 32 is connected via a resistor 33 with emitter of the transistor 28, the base-emitter path of the transistor 32 is reverse biased due to forward voltage drop in the diode 29 and thus the transistor 32 held OFF.

Where the sensing head 1 contacts the blank area or signal absence area, no outputs occur from the sensing head 1 and hence the flat amplifier 2. As a consequence, no charging current flows through the capacitor 26, which discharges the charge thereon through the resistor 34. It will be noted that in this example the discharge time constant is longer then a period of any rest in the music but shorter than the period of blank between music programs, for example, 1 second. Such discharge process causes the transistors 27, 28 to change to OFF and ON states respectively. While the transistor 28 is ON, the collecter potential thereof, as shown in C, FIG. 3, approaches ground and the base potential of the same also approaches ground. The transistor 32 however is ON because the approximate source voltage is applied to the emitter thereof by means of the charged voltage across the capacitor 31. A circuit of a large resistor 36 and another circuit of transistors 28, 32, resistor 37, 33 establish the discharge circuit path for the capacitor 31. The discharging current through these circuit paths is small and the great portion thereof flows through the transistor 32 and a parallel circuit of a resistor 38 and an additional capacitor 39. The diode 29 is disposed backward with respect to the charged voltage across the capacitor 31 and thus the discharge circuit path does not include the diode 29. For this reason the voltage charged on the capacitor 31 functions to charge the additional capacitor 39 as viewed from D, FIG. 3.

During the respective operational modes of the apparatus, the additional capacitor 39 is normally charged in the negative direction by negative pulses which are created by differentiation of rectangular signals synchronized with ON and OFF operations of the lead switch 8. The discharge current passing through the capacitor 31 results in capacitor 39 being charged to the positive potential rather than the negative potential. When the charge voltage across the capacitor 39 reaches the threshold level of the SCR 6, the SCR 6 is turned ON with results that current flow passes through the plunger and the recorder apparatus is led to the stop mode. In this manner a series of electric operations is made for detecting the blank area between individual music programs and precisely positioning the heads of the music programs in operation position.

Although the illustrated embodiment is concerned with the head positionings of music tapes, the program finder system is applicable to the other tapes on which speech, conversation or the like is magnetically recorded.

In addition, the program finding and head positioning system of the invention is not active for tapes where there is no recorded signal.

Usually, the music signals enable charging of the capacitor 31 under the fast forward and rewind mode. When the music signals appear no longer, the capacitor 31 begins the discharge mode which results in the ON state of the transistor 32. Contary to the normal conditions, in the event that no signals exist even at the starting points, the capacitor 31 will be by no means charged and accordingly the emitter bias voltage can not be supplied to the transistor 32. The transistor 32 remains in the OFF state. It follows that the SCR 6 is not triggered and the recorder apparatus is not brought into the stop mode. When the heads of the music signals are desired to be precisely positioned after passing over a long blank area, the head positioning may be carried out once thereby to avoid the shift to the stop mode where a blank area between the music signals is in the operation position.

In the event that the head positioning system of the invention is not desired to act on the apparatus, the head positioning OFF switch 14 between the emitter of the transistor 32 and the ground is turned ON so that the charging through the capacitor 31 is not allowed irrespective of the presence of the music signals. Therefore, the invention system is not effective in this instance.

The following description is directed toward the auto stop system.

During the individual modes, that is, the record, the playback, the fast forward and the rewind modes, the lead switch 8 is alternatively turned between ON and OFF states as the ring magnet 7 rotates. Due to the switching between ON and OFF states the rectangular signals as illustrated in E, FIG. 3, appear across the resistor 40. The rectangular signals E are differentiated through a capacitor 41 and diodes 42, 43, the positive pulses of the differentiated signals being discharged by passing through the diode 43 whereas the negative pulses being also discharged through the diode 42 and the capacitor 39. The capacitor 39, therefore, is charged in the negative direction. Since the negative differentiation outputs are larger than the positive charge current flowing from the power source to a resistor 44, the capacitor 39 is not positively charged. In this way, by charging the capacitor 39 to a negative constant voltage, the operations of the plunger 10 are stabilized to prevent errors in operations thereof.

When the reel wheel stops rotating at the tape end, the ring magnet 7 is stationary and the lead switch 8 is stable in either an ON or OFF state. Accordingly, the provision of the rectangular pulses E and hence, the differentiation outputs are not found. This permits the capacitor 39 to positively charge via the circuit connecting the power source and the resistor 44. When the charge level across the capacitor 39 exceeds over the threshold level of the SCR 6, the SCR 6 is ignited such that current flows through the plunger 10 to shift the states of the recorder apparatus to the stop mode. In the auto stop operations, the diode 45 connected in parallel with the capacitor 39 functions to maintain the charge voltage on the capacitor 39 created by the negative pulses F at the forward building-up voltage (about 0.7V). The function of the diode 45 is to prevent breakdown of the SCR by preventing the charge voltage from exceeding the gate break down voltage thereof. In addition, the charge time constant circuit via the resistor 44 makes a period of time constant, the period being such required that the capacitor 39 is charged from the negative voltage to the gate trigger voltage (positive voltage). Therefore, a period of time required to shift the state of the recorder apparatus to the stop mode after stopping of the reel wheel is also made constant. Since in the auto stop control circuit 9 the charge time constant circuit is comprised of the resistor 44, the diode 45 having the above mentioned function is necessary. Nevertheless, the head positioning system of the invention does not include the circuit for charging the capacitor 39 to the positive potential and the charge time constant circuit. In this case the positive charging is effected in a moment irrespective of the negative potential at the capacitor 39.

In the case where the apparatus is switched to the pause mode, the reel wheel is stationary and the auto stop control circuit 9 detects the stop condition. However, the switch 13 is ON in union with movements of a pause lever and the capacitor 39 is held at the ground potential and thus the apparatus should not be in the stop mode in this case. Moreover, the auto stop system may be cooperated with the head positioning system by applying the blank area detection signals and tape end detection signals to the gate of the SCR as trigger signals.

I claim:

1. In a system for shifting operational states of a recorder apparatus and precisely positioning heads of record areas on a magnetic tape in accordance with determinations of the presence and the absence of the signals of programs reproduced from the tape, the improvement comprising:

a first capacitor;

first means responsive to the presence of the reproduced signals to charge said first capacitor;

second means responsive to the absence of the reproduced signals to discharge said first capacitor; and third means for utilizing the discharge current of said first capacitor for generating trigger signals useful for shifting the operational states of the recorder apparatus, whereby the operational states are shifted only if the reproduced signals are first present and then absent.

2. The system of claim 1 wherein there is further provided a second capacitor, said second capacitor being charged by said discharge current of said first capacitor to a predetermined level and means responsive to said predetermined level for generating said trigger signals for shifting the operational states of said recorder apparatus.

3. The system of claim 1 wherein said first means includes first transistor switch means for supplying charging current to said first capacitor in response to the presence of said reproduced signals and said second means includes second transistor switch means for causing said first capacitor to discharge in response to the absence of said reproduced signals.

4. The system of claim 2 further comprising tape end detector means for sensing the end of said tape and generating a stop signal to said recorder apparatus in response to sensing said end.

5. The system of claim 4 wherein said end detector means generates said stop signal by charging said second capacitor to said predetermined level in response to sensing said end of said tape.

* * * * *

UNITED STATES PATENT OFFICE
CERTIFICATE OF CORRECTION

Patent No. 3,893,177 Dated July 1, 1975

Inventor(s) Takashi Takenaka

It is certified that error appears in the above-identified patent and that said Letters Patent are hereby corrected as shown below:

In the heading of the patent, insert the following:

-- [30] Foreign Application Priority Data:

September 5, 1972 ... Japan ... 89354/72 --

Signed and Sealed this

*eighth* Day of *June 1976*

[SEAL]

*Attest:*

RUTH C. MASON
*Attesting Officer*

C. MARSHALL DANN
*Commissioner of Patents and Trademarks*